United States Patent
Zhu et al.

(10) Patent No.: US 8,660,612 B2
(45) Date of Patent: Feb. 25, 2014

(54) ELECTRONIC DEVICE HAVING AN NFC ANTENNA IN A SPEAKER COMPARTMENT AND RELATED METHODS

(75) Inventors: Lizhong Zhu, Waterloo (CA); Libo Zhu, Waterloo (CA); Michael Stephen Corrigan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 167 days.

(21) Appl. No.: 13/269,117

(22) Filed: Oct. 7, 2011

(65) Prior Publication Data

US 2013/0090058 A1 Apr. 11, 2013

(51) Int. Cl.
*H04M 1/00* (2006.01)

(52) U.S. Cl.
USPC .......... 455/562.1; 455/575.7; 455/575.1; 455/90.3; 381/300; 345/156

(58) Field of Classification Search
USPC .......... 345/156, 168, 173; 455/41.1, 562.1, 455/575.7, 575.1, 90.3, 128, 129, 274; 381/300
See application file for complete search history.

(56) References Cited

U.S. PATENT DOCUMENTS

| | | | | |
|---|---|---|---|---|
| 7,167,130 B2 * | 1/2007 | Hayes | | 343/702 |
| 7,202,825 B2 | 4/2007 | Leizerovich et al. | | 343/702 |
| 7,821,782 B2 * | 10/2010 | Doherty et al. | | 361/679.26 |
| 7,825,860 B2 | 11/2010 | Ying | | 343/700 MS |
| 7,917,115 B2 | 3/2011 | Baker | | 455/277.1 |
| 8,340,329 B2 * | 12/2012 | Ogura et al. | | 381/190 |
| 2007/0060221 A1 | 3/2007 | Burgan et al. | | |
| 2008/0081631 A1 | 4/2008 | Rofougaran | | 455/452.1 |
| 2009/0005110 A1 | 1/2009 | Ozden | | |
| 2011/0111719 A1 | 5/2011 | Man et al. | | 455/269 |
| 2011/0111720 A1 | 5/2011 | Man et al. | | 455/269 |
| 2011/0111814 A1 | 5/2011 | Man et al. | | 455/575.7 |

FOREIGN PATENT DOCUMENTS

EP 2364004 9/2011

OTHER PUBLICATIONS

Michaluk, "A Closer Look at the NFC antenna battery door on the BlackBerry Bold 9900 (and reasoning why the new Torches do not have NFC)," Aug. 4, 2011, 3 pages.
"BlackBerry PlayBook Teardown," ifixit.com, accessed Oct. 5, 2011, pp. 1-5.

* cited by examiner

*Primary Examiner* — Minh D Dao
(74) *Attorney, Agent, or Firm* — Allen, Dyer, Doppelt, Milbrath & Gilchrist, P.A.

(57) ABSTRACT

An electronic device may include a housing including a speaker compartment, processing circuitry within the housing, and wireless transceiver circuitry within the housing and coupled to the processing circuitry. The electronic device may also include NFC transceiver circuitry within the housing and coupled to the processing circuitry, a speaker in the speaker compartment and coupled to the processing circuitry, and an NFC antenna positioned within the speaker compartment and coupled to the NFC transceiver circuitry.

16 Claims, 4 Drawing Sheets

ELECTRONIC DEVICE HAVING AN NFC ANTENNA IN A SPEAKER COMPARTMENT AND RELATED METHODS

FIELD OF THE INVENTION

The present invention relates to the field of wireless communications, and, more particularly, to mobile wireless communications and related methods.

BACKGROUND OF THE INVENTION

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

In some mobile applications where size and packaging are limited, it may be difficult to place an NFC antenna effectively since the typical NFC antenna relies on magnetic induction. In particular, other nearby components may cause interference and reduce the operational efficiency of the NFC antenna.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally speaking, an electronic device may comprise a housing including at least one speaker compartment, processing circuitry within the housing, and wireless transceiver circuitry within the housing and coupled to the processing circuitry. The electronic device may also include NFC transceiver circuitry within the housing and coupled to the processing circuitry, a speaker in the at least one speaker compartment and coupled to the processing circuitry, and an NFC antenna positioned within the at least one speaker compartment and coupled to the NFC transceiver circuitry.

More specifically, the NFC antenna may comprise a plurality of wire loops. The plurality of wire loops may be around the speaker. The electronic device may further comprise a pair of antenna feed lines coupling the NFC antenna to the NFC transceiver circuitry.

The speaker may comprise a magnetic portion and a movable diaphragm associated therewith. In some embodiments, the NFC antenna and the magnetic portion may cooperate with each other to provide the desired range of operation. The electronic device may further comprise a touch screen display within the housing and coupled to the processing circuitry.

For example, the wireless transceiver circuitry may comprise at least one of cellular transceiver circuitry, WiMAX transceiver circuitry, and wireless local area network (WLAN) transceiver circuitry. In some embodiments, the processing circuitry may comprise tablet computer processing circuitry. The at least one speaker compartment may comprise a plurality thereof, and the speaker may comprise a plurality thereof respectively in the plurality of speaker compartments.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 1:
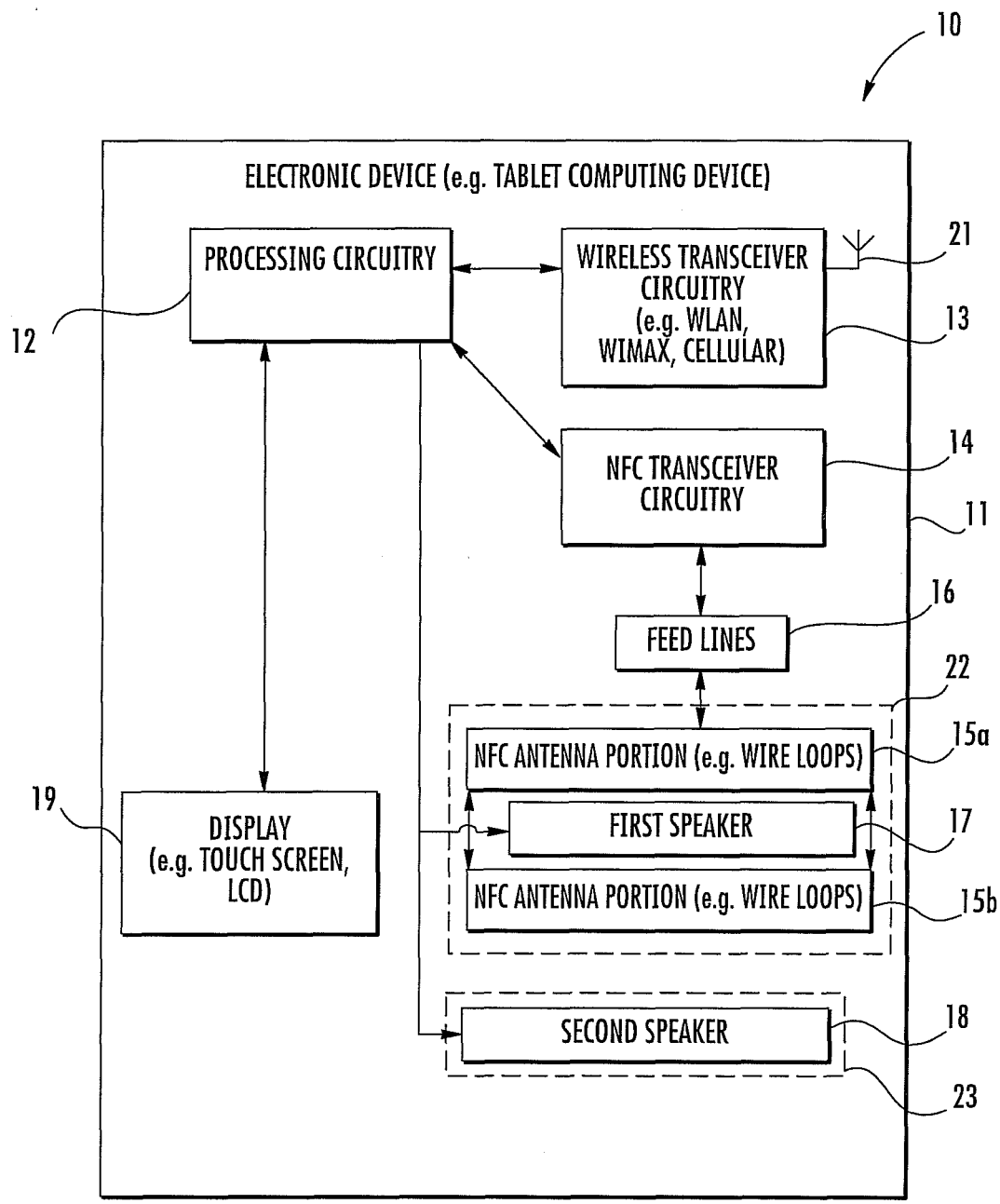
FIG. 1 is a schematic diagram of an electronic device, according to the present disclosure.
Figure 2A:
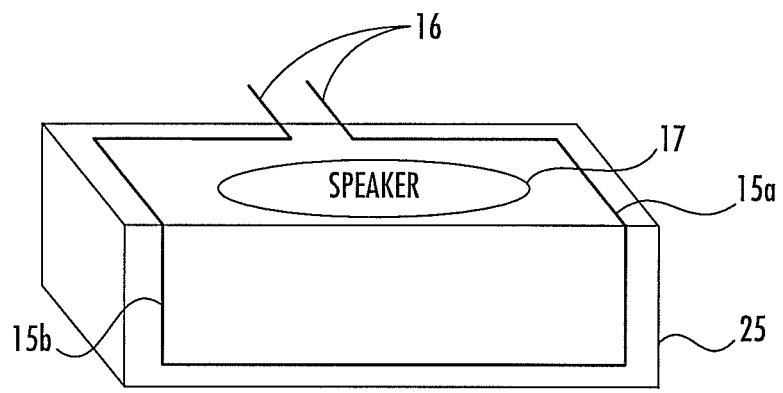
FIGS. 2A-2B are schematic diagrams of example embodiments of the NFC antenna from the electronic device of FIG. 1.
Figure 2B:
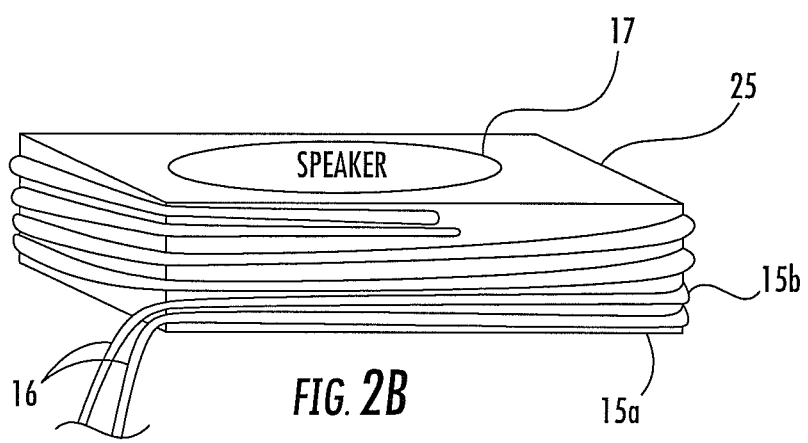
Figure 3:
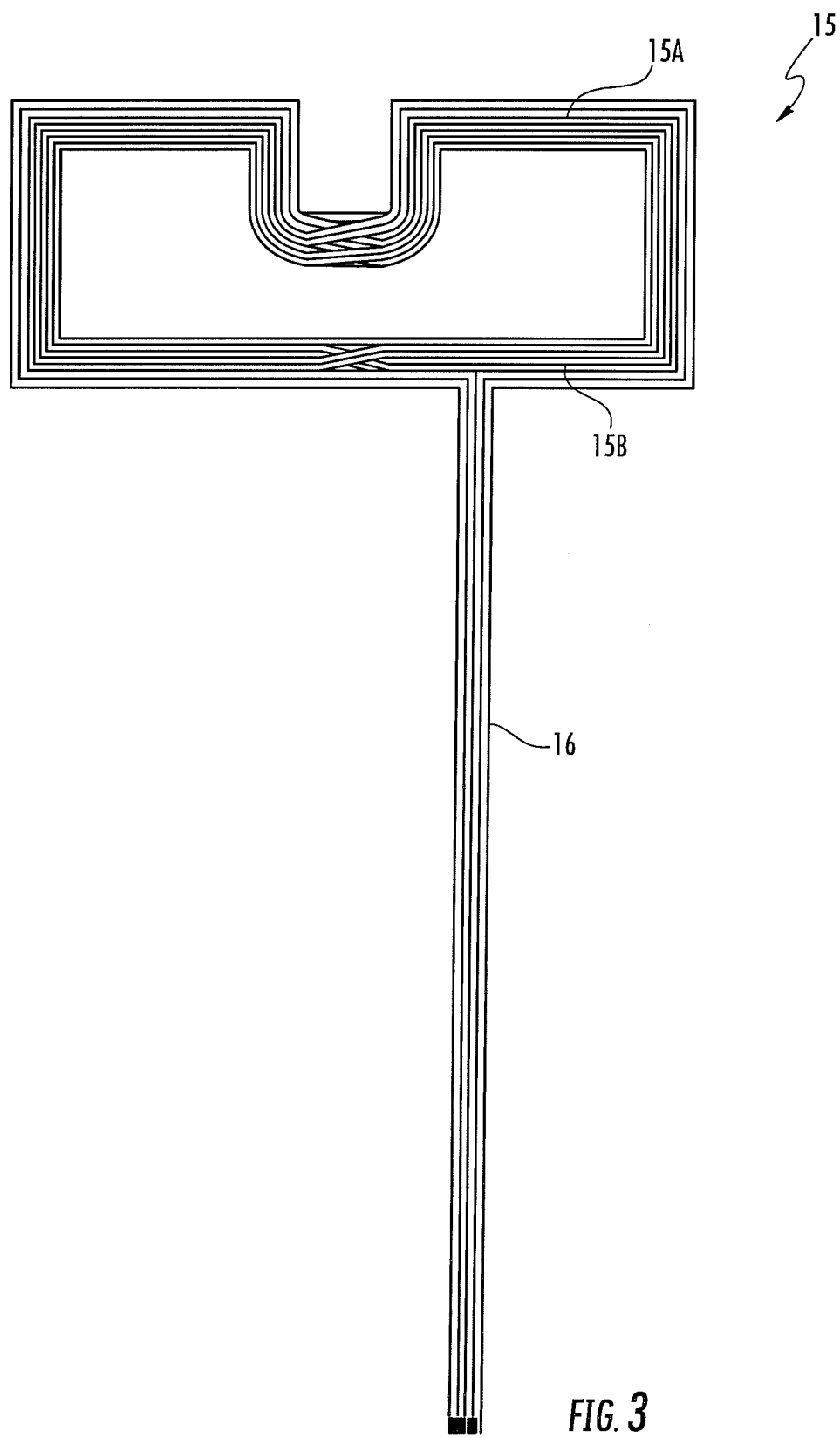
FIG. 3 is a schematic diagram of the NFC antenna from the electronic device of FIG. 1.

Referring now to FIGS. 1-3, an electronic device 10 according to the present disclosure is now described. The electronic device 10 illustratively includes a housing 11 including a pair of speaker compartments 22-23 (shown with dashed lines in FIG. 1), processing circuitry 12 within the housing, and wireless transceiver circuitry 13 within the housing and coupled to the processing circuitry. For example, the wireless transceiver circuitry 13 may comprise at least one of cellular transceiver circuitry, WiMAX transceiver circuitry, and WLAN transceiver circuitry. The electronic device 10 illustratively includes an antenna 21 coupled to the wireless transceiver circuitry 13.

The electronic device 10 illustratively includes NFC transceiver circuitry 14 within the housing 11 and coupled to the processing circuitry 12, a pair of speakers 17-18 in the speaker compartments 22-23 and coupled to the processing circuitry, and an NFC antenna 15a-15b. For example, the pair of speakers 17-18 may comprise stereo speakers positioned at the periphery of the housing 11.

The NFC antenna 15a-15b is positioned within one of the speaker compartments 22-23 and is coupled to the NFC transceiver circuitry 14. In particular, the NFC antenna 15a-15b may comprise a plurality of wire loops that are wrapped around the first speaker 17 longitudinally (FIG. 2B). In other embodiments, the plurality of wire loops may be wrapped around the first speaker 17 laterally.

In the illustrated embodiment, the electronic device 10 comprises a speaker frame 25, and the plurality of wire loops are wrapped directly around the speaker frame. In other embodiments, the speaker frame 25 may be omitted, and the plurality of wire loops may be directly wrapped around the speaker 17. In other embodiments (FIG. 2A), a single wire loop may be wrapped around the first speaker 17 longitudinally. The single wire loop is draped over a longitudinal edge and extends around the periphery of a side surface of the speaker frame 25.

In yet other embodiments, each speaker 17-18 may have wire loops wrapped around them to provide more convenient access to NFC functions. The electronic device 10 illustratively includes a pair of antenna feed lines 16 coupling the NFC antenna 15a-15b to the NFC transceiver circuitry 14. In some embodiments (FIG. 3), the NFC antenna 15a-15b may be formed on a flexible circuit. The flexible circuit would be positioned so that the conductive loops would surround the first speaker 17

The electronic device 10 illustratively includes a display 19 coupled to the processing circuitry 12. For example, the display 19 may comprise a touch screen display within the housing and coupled to the processing circuitry 12. The first and second speakers 17-18 each illustratively includes a magnetic portion. The NFC antenna 15a-15b and the magnetic portion may cooperate with each other to enhance inductive performance.

In some advantageous embodiments, the processing circuitry 12 comprises tablet processing circuitry. Further, the first and second speakers 17-18 are positioned at opposite ends of the housing 11 with the display 19 facing outward and being in between the first and second speakers.

Advantageously, the first and second speaker compartments 22-23 of the electronic device 10 have significant cavity volume, which may allow the NFC antenna 15a-15b to have a larger loop area. More so, the first and second speakers 17-18 are made of magnetic materials with high magnetic constant p. The magnetic field generated by a steady current may be enhanced by bending a wire into multiple closely-spaced loops around one or more of the speakers 17-18 to form a coil. In the following formula, the performance of such an NFC antenna 15a-15b may be modeled:

$$B = \frac{\mu_0 I}{4\pi} \int \frac{dl \times \hat{r}}{r^2},;$$

where the integral sums over the wire length, where vector dl is the direction of the current, where r is the distance between the location of dl and the location at which the magnetic field is being calculated, and where □ (r hat) is a unit vector in the direction of r. Based on an exemplary embodiment of the NFC antenna 15a-15b, when coupled to a typical Secure NFC circuit and tuned to 13.56 MHz NFC operation frequency, operational range of over 20 mm distance may be achieved.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
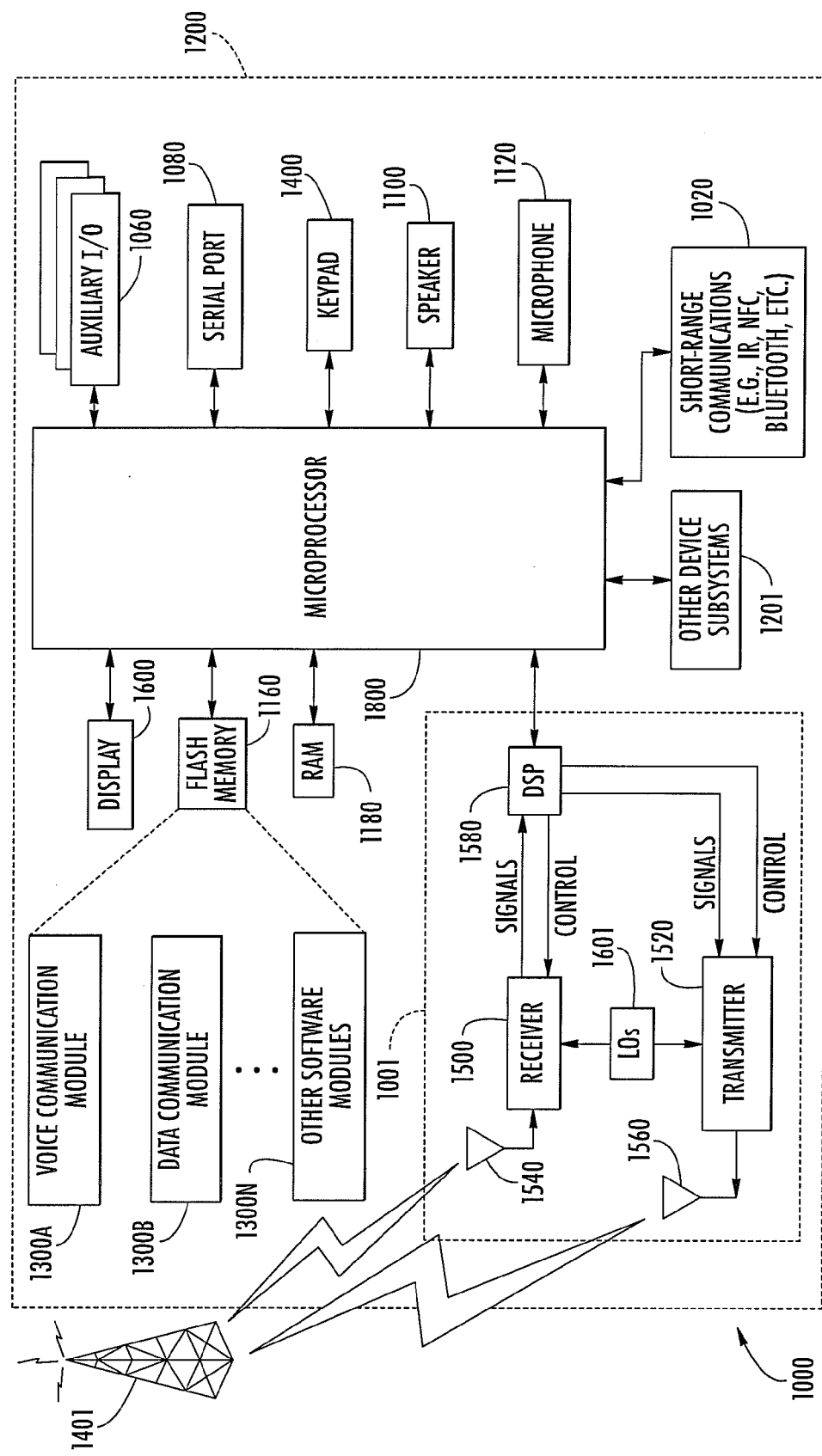
FIG. 4 is a schematic block diagram illustrating example components of a mobile wireless communications device that may be used with the electronic device of FIG. 1.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Nobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or an NFC sensor for communicating with an NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic device comprising:
   a housing including at least one speaker compartment;
   processing circuitry within said housing;
   wireless transceiver circuitry within said housing and coupled to said processing circuitry;
   near field communications (NFC) transceiver circuitry within said housing and coupled to said processing circuitry;
   a speaker in said at least one speaker compartment and coupled to said processing circuitry; and
   an NFC antenna positioned within said at least one speaker compartment and coupled to said NFC transceiver circuitry, said NFC antenna comprising a plurality of wire loops wrapped around said speaker.

2. The electronic device of claim 1 further comprising a pair of antenna feed lines coupling said NFC antenna to said NFC transceiver circuitry.

3. The electronic device of claim 1 wherein said speaker comprises a magnetic portion; and wherein said NFC antenna and said magnetic portion cooperate with each other.

4. The electronic device of claim 1 further comprising a touch screen display within said housing and coupled to said processing circuitry.

5. The electronic device of claim 1 wherein said wireless transceiver circuitry comprises at least one of cellular transceiver circuitry, WiMAX transceiver circuitry, and wireless local area network (WLAN) transceiver circuitry.

6. The electronic device of claim 1 wherein said processing circuitry comprises tablet computer processing circuitry.

7. The electronic device of claim 1 wherein said at least one speaker compartment comprises a plurality thereof; and wherein said speaker comprises a plurality thereof respectively in said plurality of speaker compartments.

8. A tablet computing device comprising:
   a housing including at least one speaker compartment;
   processing circuitry within said housing;
   wireless transceiver circuitry within said housing and coupled to said processing circuitry;
   near field communications (NFC) transceiver circuitry within said housing and coupled to said processing circuitry;
   a speaker in said at least one speaker compartment and coupled to said processing circuitry; and
   an NFC antenna positioned within said at least one speaker compartment and coupled to said NFC transceiver circuitry, said NFC antenna comprising a plurality of wire loops wrapped around said speaker.

9. The tablet computing device of claim 8 further comprising a pair of antenna feed lines coupling said NFC antenna to said NFC transceiver circuitry.

10. The tablet computing device of claim 8 wherein said speaker comprises a magnetic portion; and wherein said NFC antenna and said magnetic portion cooperate with each other.

11. The tablet computing device of claim 8 further comprising a touch screen display within said housing and coupled to said processing circuitry.

12. The tablet computing device of claim 8 wherein said wireless transceiver circuitry comprises at least one of cellular transceiver circuitry, WiMAX transceiver circuitry, and wireless local area network (WLAN) transceiver circuitry.

13. The tablet computing device of claim 8 wherein said at least one speaker compartment comprises a plurality thereof; and wherein said speaker comprises a plurality thereof respectively in said plurality of speaker compartments.

14. A method for making an electronic device comprising:
- forming a housing including at least one speaker compartment;
- coupling processing circuitry within the housing;
- coupling wireless transceiver circuitry within the housing and to the processing circuitry;
- coupling near field communications (NFC) transceiver circuitry within the housing and to the processing circuitry;
- positioning a speaker to be in the at least one speaker compartment and to be coupled to the processing circuitry;
- positioning an NFC antenna to be within the at least one speaker compartment and to be coupled to the NFC transceiver circuitry, the NFC antenna comprising a plurality of wire loops; and
- wrapping the plurality of wire loops around the speaker.

15. The method of claim 14 further comprising coupling a pair of antenna feed lines between the NFC antenna and the NFC transceiver circuitry.

16. The method of claim 14 further comprising positioning a touch screen display to be within the housing and to be coupled to the processing circuitry.

* * * * *